US009063245B2

(12) United States Patent
Lu

(10) Patent No.: US 9,063,245 B2
(45) Date of Patent: *Jun. 23, 2015

(54) EFFICIENT WAVEFIELD COMPRESSION IN SEISMIC IMAGING

(71) Applicant: International Business Machines Corporation, Armonk, NY (US)

(72) Inventor: Ligang Lu, New City, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/029,182

(22) Filed: Sep. 17, 2013

(65) Prior Publication Data

US 2014/0142860 A1 May 22, 2014

Related U.S. Application Data

(63) Continuation of application No. 13/681,718, filed on Nov. 20, 2012.

(51) Int. Cl.
*G01V 1/28* (2006.01)

(52) U.S. Cl.
CPC .......... *G01V 1/282* (2013.01); *G01V 2210/679* (2013.01)

(58) Field of Classification Search
CPC ... G01V 1/301; G01V 2210/679; G01V 1/34; G01V 1/282
USPC ........... 702/13, 14, 16, 17, 43, 66, 71; 703/2, 703/10; 367/50, 53, 57
See application file for complete search history.

(56) References Cited

U.S. PATENT DOCUMENTS 8,321,134 B2 * 11/2012 Al-Saleh .......................... 702/17
8,773,951 B2 *  7/2014 Shan et al. ...................... 367/50

(Continued)

FOREIGN PATENT DOCUMENTS

KR         2012019055 A     11/2012
WO    WO2012013665 A1      2/2012

OTHER PUBLICATIONS

Wang et al., "Acoustic inverse scattering via Helmholtz operator factorization and optimization", Journal of Computational Physics, 2010 Elsevier Inc.

(Continued)

*Primary Examiner* — John H Le
(74) *Attorney, Agent, or Firm* — Scully, Scott, Murphy & Presser, P.C.; Daniel P. Morris, Esq.

(57) ABSTRACT

A system and computer program product for seismic imaging implements a seismic imaging algorithm utilizing Reverse Time Migration (RTM) and Full Waveform Inversion (FWI) techniques requiring large communication bandwidth and low latency to convert a parallel problem into one solved using massive domain partitioning. Since in RTM and FWI, the forward wave propagation is iteratively calculated on time step increments, there are very high statistical correlation between the intermediate wavefields at the adjacent time steps. This correlation is exploited in compression of the intermediate wavefields so as to achieve much higher compression ratio and avoid the disk IO bottleneck and reduce the overall computing time substantially. Further, during simulation of a reverse wavefield, reverse predictive encoding technique is performed such that snapshots are not recovered in the reverse propagation path due to a prediction chain.

21 Claims, 9 Drawing Sheets

(56) References Cited

U.S. PATENT DOCUMENTS

2010/0054082 A1    3/2010    McGarry et al.
2010/0118654 A1    5/2010    He et al.
2011/0288831 A1    11/2011    Tan et al.
2012/0026833 A1*    2/2012    Soubaras et al. ................ 367/50
2012/0072117 A1    3/2012    Loddoch et al.

OTHER PUBLICATIONS

Gray et al., "Seismic migration problems and solutions", Geophysics 66, 1622, 2001.

* cited by examiner

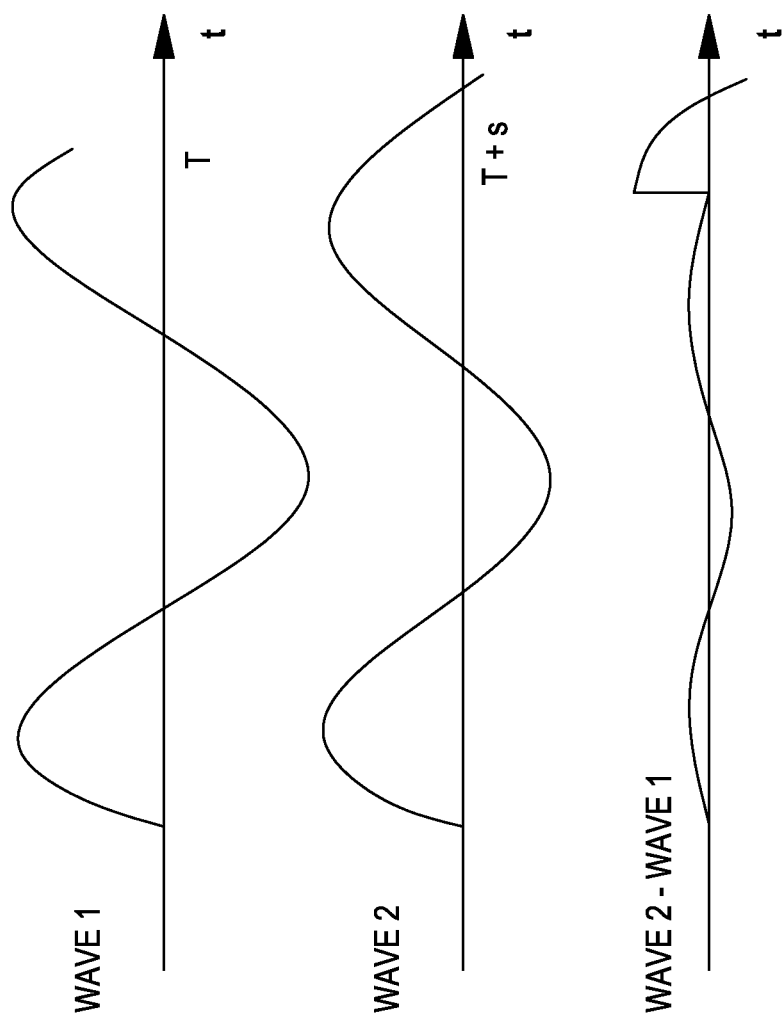

EFFICIENT WAVEFIELD COMPRESSION IN SEISMIC IMAGING

CROSS REFERENCE TO RELATED APPLICATION

This application is a continuation of U.S. patent application Ser. No. 13/681,718, filed Nov. 20, 2012 the entire content and disclosure of which is incorporated herein by reference.

BACKGROUND

The present invention relates generally to seismic imaging systems and processes, and particularly, to improvements related to systems and processes for Reverse Time Migration (RTM) seismic imaging.

Seismic imaging is the process of converting acoustic measurements of the Earth into images of the Earth's interior, much like ultrasound for medical imaging. It is widely used in oil and gas exploration and production to identify regions that are likely to contain hydrocarbon reservoirs and to help characterize known reservoirs to maximize production. These methods have become critical to the energy industry as known reserves are used up and new reserves become increasingly difficult (and expensive) to find and are increasingly in technically challenging areas, like the deep sea. For the past several decades, the energy industry has tried to balance the need to image quickly and the need to image accurately. The need for accuracy is driven by the high cost of drilling a "dry" well due to poor imaging (a deep sea well can cost over $100 million) and the need for quick imaging is driven by the cost of not finding new reserves (i.e., bankruptcy). To minimize these costs, the industry relies on supercomputing clusters and regularly increases compute power, enabling both faster imaging on existing algorithms and the practical implementation of more accurate imaging. Thus, the development of fast, efficient methods for imaging is of high importance to the industry.

Seismic imaging data varies widely depending on how and where the data is collected (e.g., on land, at sea, at the ocean surface, at the ocean floor, below ground, electromagnetically, etc). One data collection method in particular implements a towed hydrophone receiver arrays for ocean seismic data collection. The basic idea is shown in FIGS. 1 and 2 depicting a ship 200 shown towing a 2D array 212 of hydrophones spaced about every 25 m on 1 to 16 trailed streamers. Every 15 or so seconds, an air cannon is fired into the water creating an acoustic wave, e.g., a shot 209 that propagates through the water and into the Earth. As shown in FIG. 2, reflections 202 in a forward direction from various surface and subsurface boundaries cause echoes that reflect back and are recorded by each hydrophone in the array 212. The recording of a single hydrophone in time as a trace and the collection of traces for a single firing of the air cannon is called a common shot gather, or shot 211. As the ship 200 moves, a large set of spatially overlapping shots is recorded. Depending on the size of the survey region to be imaged, this data collection can take a month or more and is designed to get the maximal coverage of the area to be imaged. The receiver data R(x,y,z,t) collected for potentially hundreds of thousands of shots is the result of some source data S(x,y,z,t) from shots 209 at particular locations.

Two critical requirements drive production seismic imaging: The need for improved imaging to accurately locate and characterize elusive oil and gas reservoirs; and the need for timely subsurface imaging. Drilling too soon risks expensive dry wells while drilling too late risks delaying the time to oil. To minimize these risks, the industry regularly increases the power of its supercomputing clusters, enabling both faster imaging on existing algorithms and the practical implementation of more accurate imaging. However, raw supercomputing power is not enough. It is equally important—if not more so—to implement algorithms efficiently based on a detailed knowledge of the hardware.

The Reverse Time Migration (RTM) algorithm (see, e.g., Gray, S. H., Etgen, J., Dellinger, J., Whitmore, D., Seismic migration problems and solutions, *Geophysics* 66, 1622, 2001) is widely used in the industry because of its superior imaging accuracy for difficult subsurface structures like salt domes which are poorly imaged by other algorithms but which are very effective at trapping oil and gas. Several variants of RTM exist with differing degrees of approximation to reality, all of which use single-precision arithmetic.

In seismic imaging techniques has processed shot gathers individually on a single compute node so that they could be processing in parallel. This approach has many benefits; but for algorithms like RTM, as computational power increases, data I/O becomes the single largest performance bottleneck, particularly when the model is large.

The RTM algorithm arises from the observation that pressure waves should be correlated at reflection boundaries; so RTM proceeds by correlating two pressure waves (called the forward and backward waves) to find those boundaries. To generate the waves for correlation, RTM simulates wave propagation using the wave equation for a wave that includes: generating a forward wave calculation $P_S(x,y,z,t)$ from equation 1) given a source data term $S(x,y,z,t)$ representing the source "shot" or sound wavefield 209 as shown in FIG. 2, $$\left[\partial_x^2 + \partial_y^2 + \partial_z^2 - \frac{1}{v^2(x,y,z)}\partial_t^2\right]P_S(x,y,z,t) = S(x,y,z,t) \quad 1)$$

and generating a backward (or reverse) wavefield calculation $P_R(x,y,z,t)$ simulating backward wave propagation 204 using the wave equation from equation 2) given the receiver data R(x,y,z,t) collected by the receiver arrays 212 according to:

$$\left[\partial_x^2 + \partial_y^2 + \partial_z^2 - \frac{1}{v^2(x, y, z)}\partial_t^2\right]P_R(x, y, z, t) = R(x, y, z, t) \quad 2)$$

The forward wavefield computation corresponds to the waves 202 generated from the air cannon firing and propagating forward in time using a "velocity model" represented by V(x,y,z), which specifies the wave velocity at each point in space and represents the various material properties and boundaries of the volume being imaged. The air cannon firing is treated as a wavelet impulse localized in time and space. As shown in FIG. 2, the backward wavefield computation is generated by using the shot data recorded (received) by the hydrophone array as the source term for the wave equation and propagating that as backward propagating waves 204 backward in time. These two waves are then multiplied point-wise at each time step to generate an image, using the following "imaging condition" as shown in equation 3) as follows:

$$I(x,y,z) = \Sigma_t P_S(x,y,z,t) P_R(x,y,z,t) \quad 3)$$

where $P_S(x,y,z,t)$ is the reflected forward power pressure wave at a coordinate and $P_R(x,y,z,t)$ is the reverse power pressure wave at an x, y, z coordinate at a time t.

This process is repeated for all shots in the seismic survey and the images generated are summed to create a final image of the reflecting boundaries, which represent the subsurface structure. It is important to note that the time summation in the imaging condition implies that the first time step of the forward wave needs to be correlated with the last time step of the backward wave. This constraint is typically handled in one of two ways: either the forward wave is saved to disk (called a "snapshot") every several time steps and read in for imaging when the backward wave is computed, or the forward propagation is run twice—once forward in time and once in reverse time using boundary data saved from the forward pass to recreate the forward pass in reverse—and then imaging proceeds with the backward wave and the reverse forward wave.

Both Reverse-time Migration (RTM) and Full Waveform Inversion (FWI) are the state of the art techniques in seismic imaging as they offer multiple improvements over other seismic exploration techniques in accuracy and quality, especially when reserves located in structure formation with large velocity contrast, steep dipping, and salt. However, applying them in oil exploration requires to process very large dataset in the amount of tens of terabytes and intensive computation. Even with advanced parallel computer systems, the prior art implementations of these techniques typically take weeks or months to complete the calculation and generate a good quality seismic subsurface structure image for a model with a volume of 1000×1000×600 points.

One of the major problems of the prior art computing systems is the storage of the intermediate results. For example, in its calculation process, RTM will generate intermediate results in the amount of terabytes that need to be kept for later use. In the prior art solutions, the intermediate results are transmitted out to disk storage and fetched in when needed. Because the disk input/output (I/O) operations are much slower than the parallel computing process, the prior art RTM computing performances are bounded by the disk I/O operation speed and hence result in much slower run-time performance.

The prior art solution to reduce the amount of data through the disk I/O is to compress each wavefield data before it is written to the disk and decompress it after it is read in. To prevent the data fidelity loss, lossless compression is typically used. However, the state of the art lossless compression can only achieve compression ratio in a range around 2~4 to 1 on wavefield data. So the disk I/O operations for output and input the intermediate data still become the performance bottleneck. Using lossy compression may achieve higher compression ratio but it is not desirable because of the data fidelity loss. Therefore, a new method for intermediate data compression is desirable to improve the performance over the prior art solutions.

SUMMARY

As in RTM and FWI, the forward wave propagation is iteratively calculated on time step increments, there are very high statistical correlation between the intermediate wavefields at the adjacent time steps. Therefore, a system and method is provided that exploits such correlation in compression of the intermediate wavefields to achieve much higher compression ratio to avoid the disk IO bottleneck and substantially reduce the overall computing time.

Thus, according to one aspect, there is provided a system, method and computer program product for inter-wavefield compression for seismic imaging. The method comprises: computing at compute nodes of a processing computer device, data representing contributions of forward wavefield propagation data and reverse wavefield propagation in a RTM (reverse time migration) process in which a forward wavefields propagated by a shot is simulated in a forward propagation path at iterative time instants, and reverse wavefields propagated by the shot is simulated in a reverse propagation path at iterative time instants; and using the computed forward wave propagation data and reverse wave propagation data contributions form an imaging condition from which an image of sub-surface formations is created, wherein, the method comprises: during the forward wavefield propagation path, obtaining a difference of two forward wavefields computed at adjacent time instants; compressing the difference and storing the compressed difference at a local memory storage device associated with a compute node; during the reverse propagation path, retrieving from the local memory storage device of the compressed difference of the forward wavefields at a time instant when image conditioning is needed; decompressing the compressed difference, and recovering the forward wavefield from the compressed difference.

In one aspect, a current time instant is "t", and a parameter "s" represents a snapshot frequency 1/s, the obtaining a difference of two forward wavefields computed at adjacent time instants occurs at a multiple "n" of the snapshot frequency, s, where time step t=ns, where n is an integer.

In the forward wavefield propagation path, the simulating the forward wavefield comprises: determining whether a current time step "t" is at or prior to a final time instant "N" of forward path iterative time instants; and if current time step t<=N, computing a forward wavefield propagation data at time the instant; otherwise, simulating a reverse wavefield in the reverse propagation path at the iterative time instances in reverse time order.

The method further comprises: determining whether a current time instant t=ns; and if the current time t=ns, computing a forward wavefield snapshot calculation, FW(t), and buffering the FW(ns) wavefield data in the local memory storage device, where t=ns.

The obtaining the difference of two forward wavefields comprises, for the current time step t=ns: waiting for a forward wavefield shot calculation at next adjacent time instant t=(n+1)s and computing wavefield data FW(n+1)s at the next time instant; computing the compressed wavefield difference D(ns) according to D(ns)=FW(ns)−FW(n+1)s; and storing D(ns) in the local memory storage device.

Taking the difference of wavefields in the reverse order create a method to implement reverse predictive encoding such that in the reverse propagation path, there is no need to recover and keep all previous snapshots before to recover the current snapshot due to the prediction dependent chain.

A computer program product is provided for performing operations. The computer program product includes a storage medium readable by a processing circuit and storing instructions run by the processing circuit for running a method. The methods are the same as listed above.

BRIEF DESCRIPTION OF THE DRAWINGS

The objects, features and advantages of the present invention will become apparent to one skilled in the art, in view of the following detailed description taken in combination with the attached drawings, in which:

FIG. 5 illustrates two 1D waveforms representative of forward path waveform propagation at two time instances and a difference waveform;

DETAILED DESCRIPTION

A system, method and computer program product for seismic imaging implements a seismic imaging algorithm utilizing Reverse Time Migration technique requiring large communication bandwidth and low latency to convert a parallel problem into one solved using massive domain partitioning.

In particular, the system and method performs a reverse inter-wavefield compression technique when performing RTM seismic imaging that achieves a much higher compression ratio that avoids disk I/O bottleneck and eliminates or significantly reduces the disk I/O time and compression/decompression time substantially when creating an image of sub-surface formations in a defined volume of a geological structure according to the RTM imaging algorithm. Therefore the seismic imaging computation time is reduced.

Figure 1:
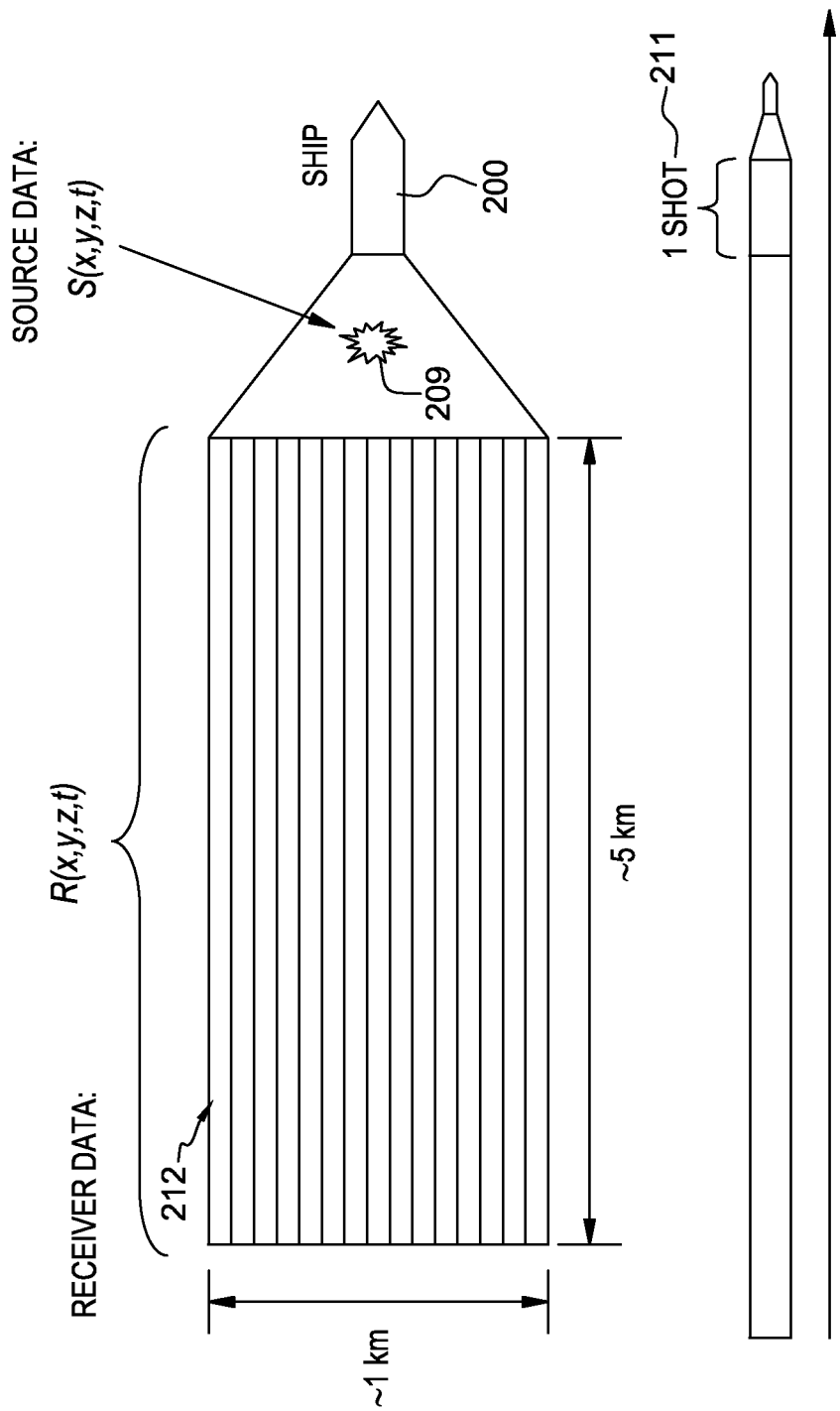
FIG. 1 depicts one RTM seismic data collection method implementing a towed hydrophone receiver arrays for ocean seismic data collection.
Figure 2:
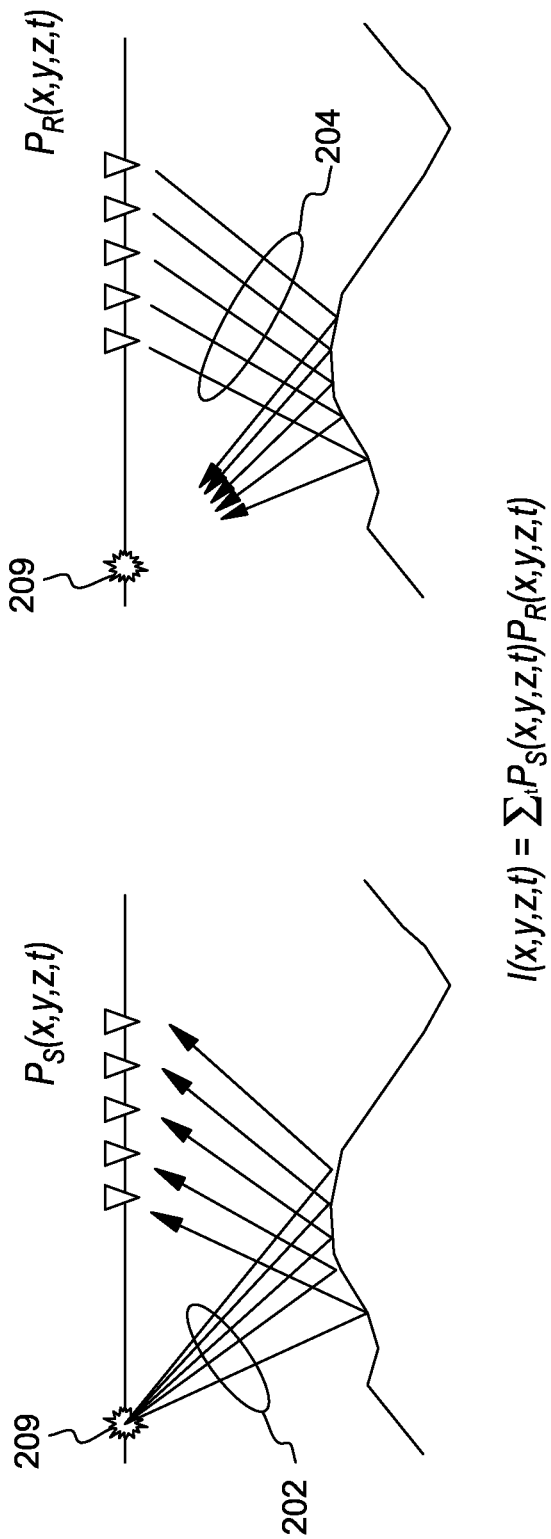
FIG. 2 depicts an example RTM imaging computation for generating the imaging condition from computed forward wave $P_S(x,y,z,t)$ and reverse wave $P_R(x,y,z,t)$ propagations.
Figure 3:
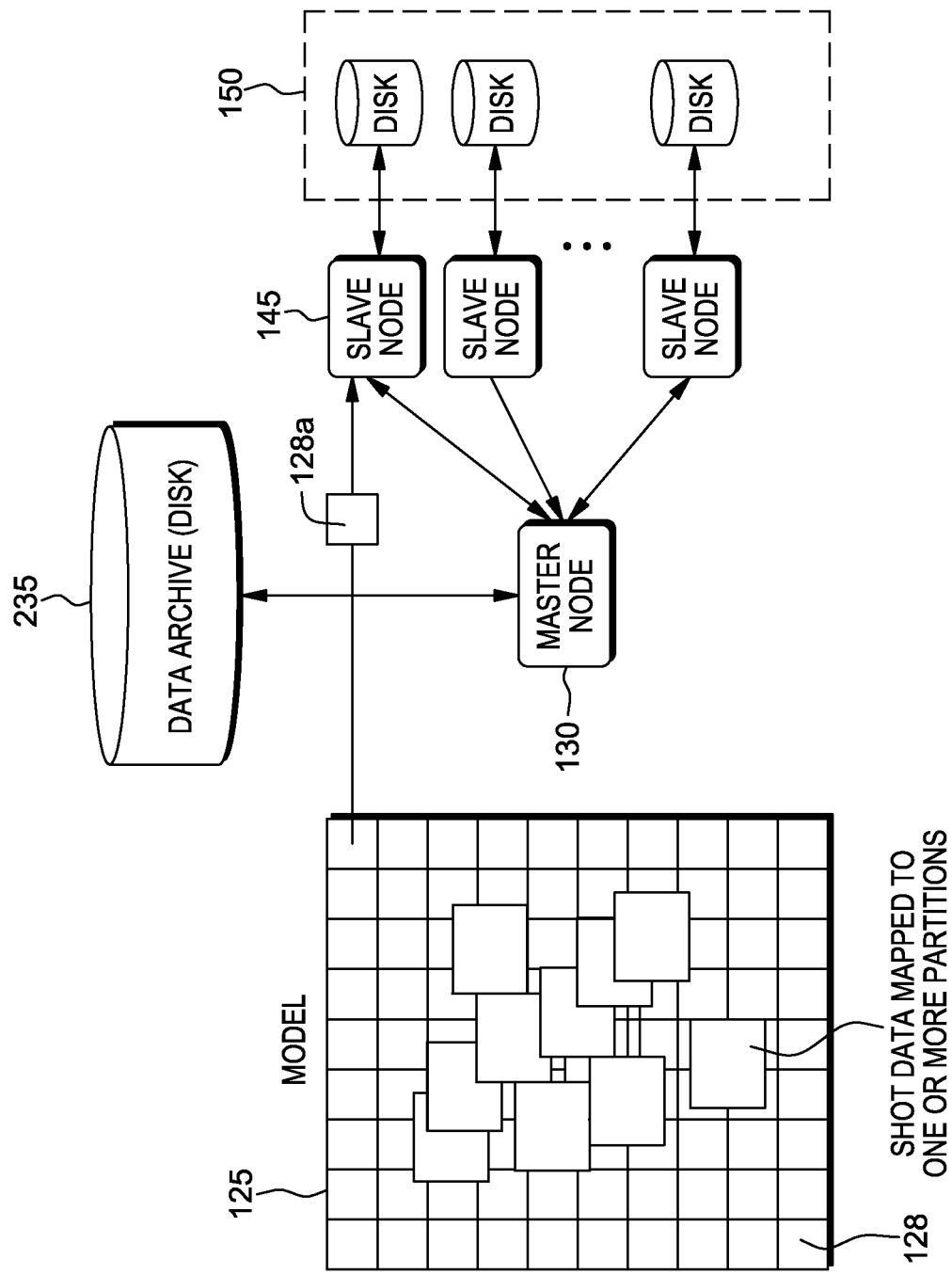
FIG. 3 depicts a velocity model volume being partitioned into sub-volume that each is individually assigned to a respective slave node for computing a sub-image, during which the generated intermediate data may be stored locally at a compute node, or via external storage.

Referring to FIG. 3, there is depicted a velocity model V( ) 125 that is partitioned into sub-volumes 128 that each individually is assigned to a respective slave node 145 in a parallel multi-node computing system such as the Blue Gene® computing system. Any shot data within that object is thus assigned to and processed by that slave node. In the embodiment depicted, all data may be processed at once with domain decomposition. Any compute system with many nodes or processors, such as a Blue Gene® supercomputer, or a compute cluster or a compute cloud, etc., can be used.

In one non-limiting embodiment, the partitioning of the velocity model 125 is performed according to a uniform spatial partitioning scheme, in which each dimension of the model is divided into equal- or approximately equal-sized groups of points creating the blocked structures. In another embodiment, the partition can be done non-uniformly so as to balance the amount of work required for each block. The configurability of the partitioning may be motivated by minimizing the run time. In such an embodiment, the block would not be necessarily the same size.

Even using the domain partitioning, a large 3D velocity model, e.g. with a model size of $1024^3$, will produce a huge amount of intermediate data, for example, in industry, the typical total time steps are 15000~20000 and the snapshot saving frequency is 3~5 time steps per snapshot, requiring to store about 12~24 TB. Thus, the computing system may not have enough local memory to keep such amount of intermediate and have to store data in the scratch disk. The disk I/O of large amount of data will cause severe latency and become a performance bottleneck, consequently slowing down the processing time.

As mentioned, the method for calculating the RTM imaging condition may be run a powerful computing system such as Blue Gene® computing system. First, there is input to the nodes of the system a data set including the velocity model V(x,y,z) and associated model parameters (e.g., isotropic, VTI (Vertical Transverse Isotropy), TTI, (Tilted Transverse Isotropy)) which are loaded to the respective local node memories. The parameters are run to configure the node for the RTM seismic imaging processing. For example, theses may include the code execution parameters, i.e., the model size (e.g., the size(s) of the model partitioning as determined by details of the hardware implementations—e.g., IBM Power7, Blue Gene®, Intel Xeon Westmere clusters, etc.), local node memory size, the iteration numbers, the snapshot frequency, etc. Further input as part of data set are the Shot Data (Source/Receiver Data); the source data being created by an air cannon or other noise source but is modeled at each node using a "wavelet" (a finite wave that can be represented in numerous ways as known to those skilled in the art). There are many specific wavelets that can be used, e.g., a Ricker wavelet in one implementation. The receiver data on the other hand is specifically recorded using the recording devices and it is these measurements that are used in the backward processing stage as input.

After configuring the domain partitioned nodes, the source and receiver data are read from the storage device, whether external disk or locally. Data is read from where the data is stored, e.g., either local compute node storage, or the remote storage disk, and distributed for processing at each node. In one aspect, the method described herein adaptively computes an amount of the data (e.g., including input data, receiver data, temporary calculations results, or intermediate result data) that is to be stored to local memory storage (e.g., RAM, DRAM) at each compute node of the massively parallel system. However, in alternate embodiment, these types of data may be stored in a flash memory available at each node of the massively parallel system and/or may be stored in the node's associated scratch disk. It is understood that alternate embodiments contemplate various combinations of data storage as well, wherein data may be stored in each memory mode (local node memory, flash and/or disk).

Further, there is performed partitioning of the model, i.e., the model space/data is partitioned into sub-spaces for the multiple nodes to process them in parallel.

A next sequence of steps describes the RTM processing at each node after the partitioning.

Figure 4:
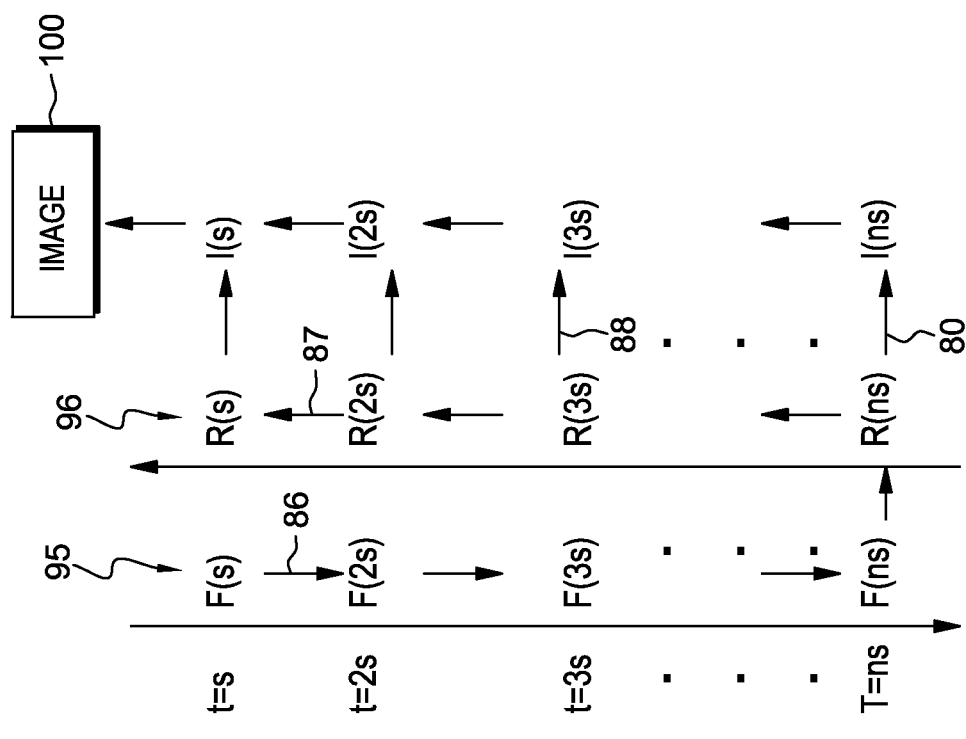
FIG. 4 depicts the forward path and backward path of the RTM method for calculating the imaging condition.

FIG. 4 shows a processing loop 72 performing the RTM seismic imaging algorithm in accordance with one embodiment. The RTM image data processing method 72 seeks to achieve an imaging condition of the sub-surface formations by calculating forward and reverse components of the propagating wave. Each of these steps, described herein with respect to FIG. 4 preferably employs local memory storage for storing locally at the node memory, computed forward propagating wave components, however, can utilize local flash memory at the node and/or the attached scratch disk for the temporary storage as adaptively computed in the manner described herein.

In FIG. 4, there is calculated a forward propagation pressure wave, $P_S(x,y,z,t)$ at every timestep (for a single shot (having, e.g., 10-20 thousand time steps)). The forward power pressure wave $P_S(x,y,z,t)$ calculation at every $s^{th}$ timestep is either stored as a snapshot to node memory storage (alternately including storing to a flash memory and/or disk) every $s^{th}$ iteration in a forward propagation phase 95 of the algorithm 72. Each snapshot may include compressing the $P_S(x,y,x,t)$ (using an intra-wavefield compression) and then, writing of compressed $P_S(x,y,x,t)$ data to memory or disk. As shown in FIG. 4, the forward pressure wave at every timestep t is represented as functions FW( ) and are calculated in forward order (e.g., time t=1, 2, 3, . . . ) in the process, as depicted by arrows 86. At some time instances t=ns, where n is an integer, the snapshot of the wavefield, e.g., FW(s), FW(2s), FW(3s), . . . , FW(ns), etc., is stored. As I/O bandwidth (i.e., write out and read back of computed wavefield data to/from a storage disk) is limited (as compared to CPU speed processing) and the capacity of local memory is also limited, the wavefield data FW( ) is compressed so that the compressed wavefield FW( ) data may be written out faster or taking less local memory to store at these time steps (and read back in the backward (reverse propagation) path. Then, there is calculated reverse propagation, $P_R(x,y,z,t)$ at every t timestep (for a single shot having, e.g., 10-20 thousand time steps). That is, in a reverse propagation phase 96, the backward or reverse pressure wave represented as function BW( ) is calculated in reverse order according to the time steps. Furthermore, as the imaging condition requires matching forward wave calculated at the same time instance, the saved forward pressure wave snapshots are used. Thus, during the calculation of the reverse pressure wave data, when the image condition is required, the values for the forward propagation at the time instances are needed. The calculations performed in the reverse propagation phase 96 include: calculating reverse power pressure wave BW(t) (i.e., $P_R(x,y,z,t)$) at every time step according to the reverse time flow represented by arrows 87. The steps include, at each time step (in reverse order): calculating BW( ) at that step using reverse path wavefield equation, at the time instance when imaging condition is performed, reading the prior stored corresponding $P_S(x,y,x,t)$ compressed wavefield data FW(ns), FW((n−1)s), . . . , FW(s) from disk to local memory, decompressing, and computing the imaging condition.

During these steps in reverse propagation phase 96 as depicted by arrows 88, there is further calculated the partial sum of the image, represented as function I( ) at each image conditioning time (in reverse order) beginning at time step 80.

For example, at each step t=ks, the reverse propagation phase will include the calculating of the partial images I(ks) from the stored/loaded FW(ks) and BW(ks), I((k+1)s) values in reverse order, etc., until an image I(s) is computed at step 100. (The image is computed accumulatively).

Since in RTM and FWI, the forward wave propagation is iteratively calculated on time step increments, there are very high statistical correlation between the intermediate wavefields at the adjacent time steps. Such correlation in compression of the intermediate wavefields is exploited to achieve a much higher compression ratio to reduce the memory required to store snapshots and/or the disk I/O bottleneck and thus reduce the overall computing time substantially.

To achieve a much higher compression ratio, use is made of the high correlation between the wavefields generated at the adjacent time steps. Instead of compressing the wavefield, only the difference between the wavefield at the current time step and the wavefield at a previous time step is being compressed and the compressed difference is stored. Because of the high correlation, the difference of the wavefield has smaller information entropy; therefore compression of the difference can achieve a much higher compression ratio as compared to compression of the wavefields themselves.

To achieve higher compression ratios in RTM and FWI seismic imaging applications, there is provided a method that exploits the high correlation between the wavefields.

That is, in RTM or FWI seismic imaging application, the wave propagation is computed iteratively in time and space and high statistical correlation exists among wavefields at nearby time instants. FIG. 5 illustrates two 1D waveforms representative of forward path waveform propagation at two time instances, e.g., wave at time t=T or "Wave 1" and Wave at t=T+s or "Wave 2". In this embodiment, s=the time step for taking the waveform snapshot. Because there exists correlation, the difference (in time) of the adjacent generated wavefields, i.e., Wave 2−Wave 1 in adjacent time steps, has much smaller signal energy or information entropy than the wavefield data itself. Thus, a much higher compression ratio can be achieved.

As the stored forward wavefield propagation snapshots are used in the backward propagation path in the reverse time order, then, to recover an inter-wavefield coded snapshot, the previous wavefield is needed. This will cause a chain dependency (i.e., all previous wavefields snapshots need to be decompressed and recovered before the current one can be recovered).

In production of seismic imaging, as the number of time iterations is typically in tens of thousands, it will be impractical to keep all the needed wavefields in the memory. In the exemplary embodiments, a reverse predictive coding approach is implemented. In this approach, there is a two part process implemented by a computing system including 1) forward wavefield propagation path processing in FIG. 6A; and 2) reverse wavefield propagation path processing in FIG. 6B.

Figure 6B:
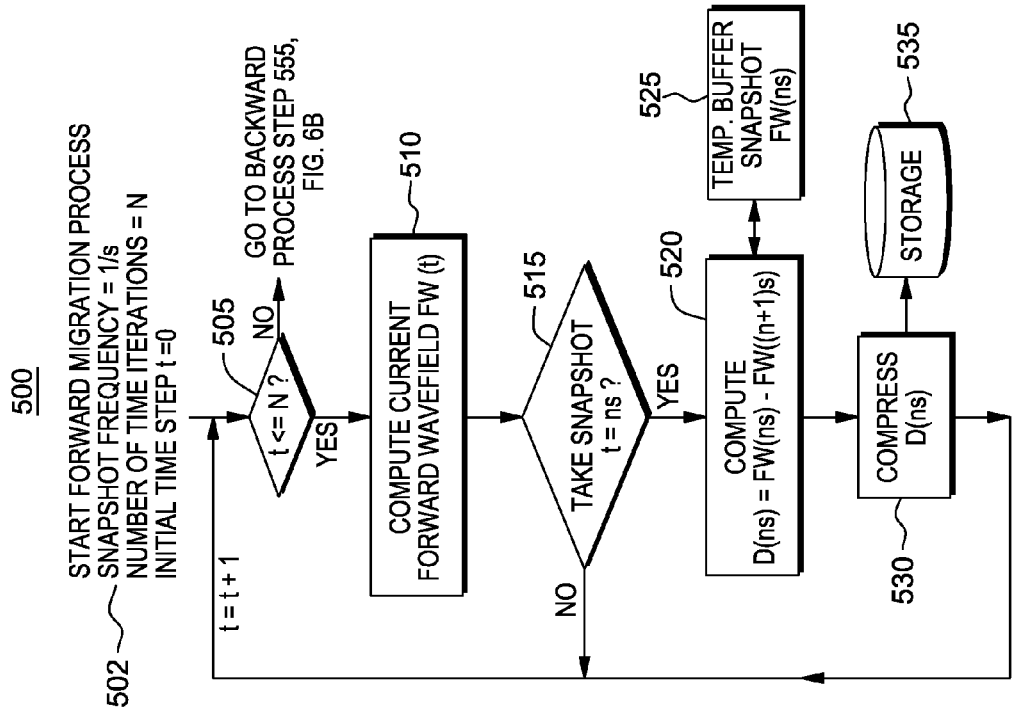
FIGS. 6A and 6B depicts an embodiment for performing reverse prediction based inter-wavefield compression.
Figure 6A:
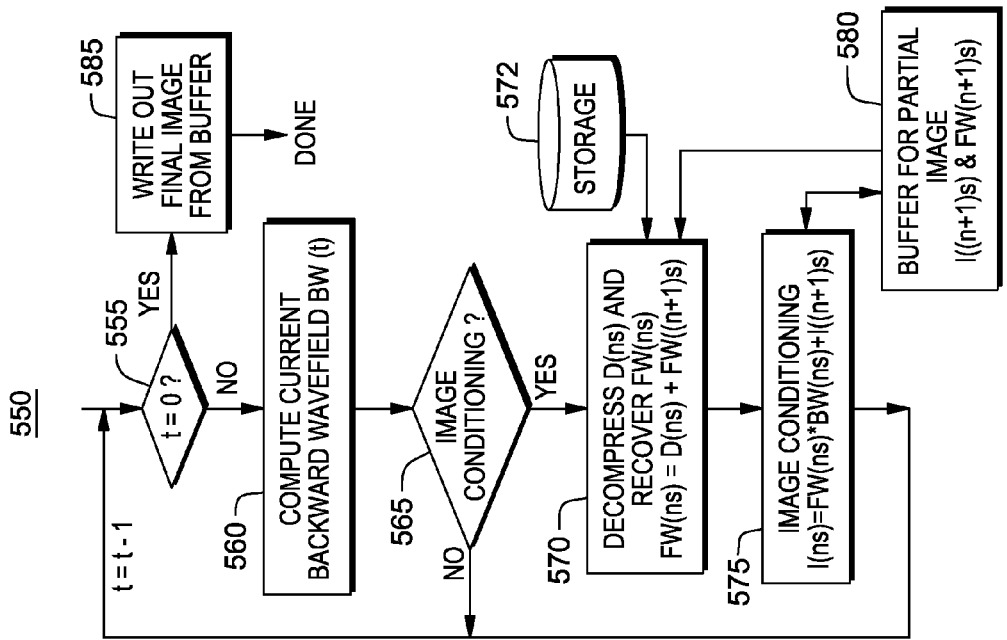

FIG. 6A shows, in one embodiment, Reverse Inter-Wavefield Compression processing method 500 for seismic imaging applications for lossless compression cases, and the treatment of stored compressed data used in the reverse time order computations. In this embodiment, prediction is in reverse, i.e., using the current waveform in the backward path, will not require the recovery of the whole dependency chain, only the last wavefield stored itself. That is, by taking the difference of wavefields in the reverse order, a reverse predictive encoding method is implemented such that, in the reverse propagation path, there is no need to recover and keep all previous snapshots before to recover a current snapshot due to the prediction dependent chain.

Figure 7:
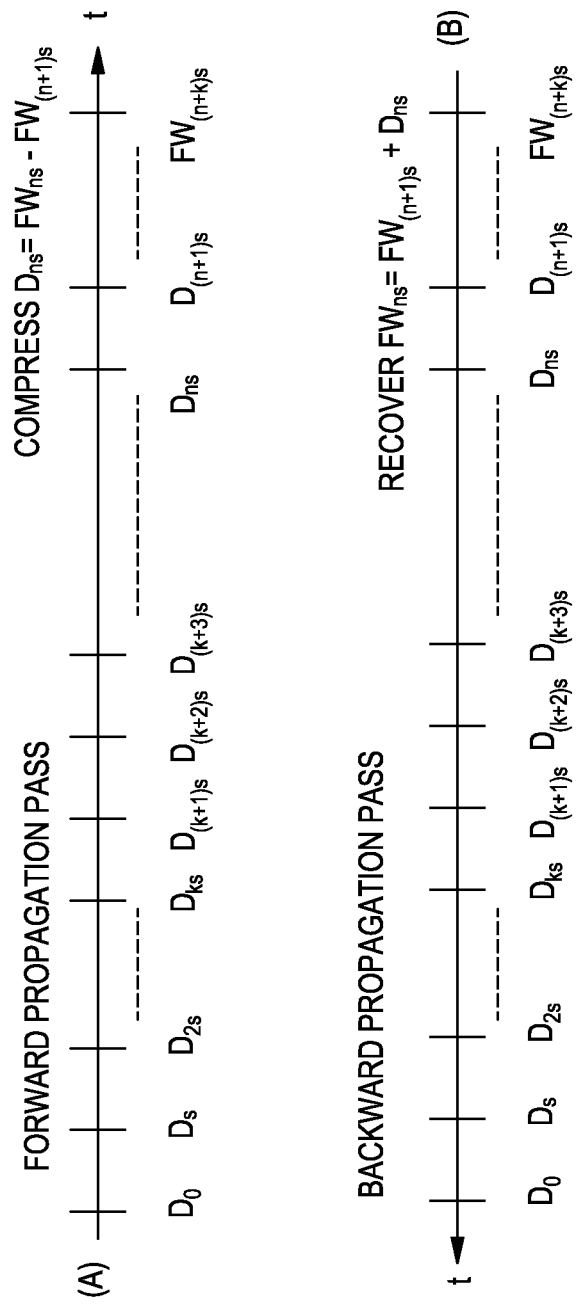
FIG. 7 conceptually depicts a timeline of the process of FIGS. 6A and 6B for obtaining wavefield difference data for inter-wavefield compression at snapshot time steps.

As shown in FIG. 6A at 502, the method first specifies in the forward migration process (a forward propagation path) a snapshot frequency=1/s; a number of time iterations=N; and an initial time step t=0, where "t" is an iteration time index; and, "n" is an index of the number of snapshots. As shown in the timeline of FIG. 7, the process obtains data $D_0, D_s, \ldots, D_{2s}, \ldots, D_{ns}$ wherein at each corresponding time step, there is computed current forward wavefield FW(t). The method includes taking the difference of two wavefields at some time instant when a wavefield snapshot is needed; when a snapshot is needed, i.e., a wavefield difference calculation is performed to obtain $D_{ns}=FW_{ns}-FW_{(n+1)s}$. Then $D_{ns}$ is compressed and stored in memory or disk.

That is, as shown in FIG. 6A, in the forward wavefield propagation path: the computing system, at 505, performs determining whether the current time step "t" in the forward wavefield calculation path is at or prior to a time instant "N" when forward path iteration is completed, i.e., t<=N? If current time t is less than or equal to N, i.e., time t does not exceed N, then the process continues at 510 where the computing system performs computing the forward wavefield FW(t) at the current time step t. Otherwise, if it is determined at 505 that t>N, then the process proceeds to the backward wavefield propagation path step 550 of FIG. 6B.

Returning to 510, after computing the forward wavefield FW(t), a determination is then made at 515 whether a snapshot is to be taken. If a snapshot is to be taken, that is, at 515, if it is determined that t is a multiple of s, i.e., t=ns, then the current wavefield is a snapshot FW(ns) (n is an integer) to be held and (buffered or stored) temporarily in computing system memory. This FW(ns) is not immediately compressed, rather, the process waits until the next snapshot time instant (n+1)s when the next wavefield snapshot data FW(n+1)s becomes available. A wavefield difference is obtained $D_{ns}=FW_{ns}-FW_{(n+1)s}$. Then $D_{ns}$ is compressed and stored in memory, or send out to disk.

Otherwise, returning to 515, if it is determined that a current wavefield data is not to be stored, i.e., t≠ns, then the current wavefield is not stored, "t" is incremented by 1 (t=t+1), and the process returns to step 505. Continuing to 530, the inter-wavefield difference is computed at 520 according to:

$$D(ns)=FW(ns)-FW((n+1)s)$$

wherein compressed data D(ns) is a predictively encoded. The computed previous snapshot of FW(ns) is buffered in local system node memory at 525. However, in this embodiment, it is the wavefield difference D(ns) that is being compressed and stored in storage device (e.g., in memory or to disk) at 535. The process returns to step 505, where the time step is incremented, i.e., t=t+1, and the process repeats for the further wavefield propagation.

Returning to 510, if it is determined that t>N, then the process proceeds to the backward propagation path step 555 of FIG. 6B.

Continuing in backward propagation path step 555 of FIG. 6B, a determination is made as to whether t=0, i.e., the backwards propagation step has reached its final iteration in reverse time order. If it is determined that the current time t is equal to 0, this further indicates achieving the imaging condition and the "Final" computed image is written out from the memory storage buffer at 585 and the process for that shot terminates.

If, at 555, time t is not equal to zero, i.e., time t≠0, then the process continues at 560 where the backward wavefield propagation data BW(t) for that current time step "t" is computed.

The process proceeds to 565, where a determination is made as to whether it is time to perform an image conditioning. If it is not time to perform image conditioning at 565, then time step "t" is decremented by 1 (t=t−1), and the process returns to step 555 for processing at the next time instant (in reverse time order). Otherwise, if it is determined that it is time to perform an image conditioning (i.e., t is a multiple of s), then process proceeds to step 570 where a stored inter-wavefield difference is retrieved and the resultant data de-compressed. That is, in order to recover the last whole wavefield, at 570, the whole prior wavefield (dependency chain) does not need to be available. All that is required is to retrieve stored compressed D(ns) from disk or local memory storage and de-compress it to recover the FW(ns) snapshot wavefield data according to:

$$FW(ns)=D(ns)+FW((n+1)s)$$

In this embodiment, the snapshot saved last is used first in the backward propagation path. To recover whole wavefield, the previous wavefield needs the stored D(ns) and is decompressed to recover FW(ns) from memory 572.

Continuing at 575, FIG. 6B, the Image Conditioning is computed to generate the partial image using the backward wavefield and forward wavefield according to:

$$Img(ns)=BW(ns)*FW(ns)+Img((n+1)s);$$

wherein BW(ns) is the computed reverse wavefield propagation data value at time t=ns, and Img((n+1)s) is a prior stored partial image from a prior image conditioning computation obtained from memory or external disk stored at a prior snapshot time instant t=(n+1)s in reverse time order. That is, in the computation of the image condition at the current snapshot, buffered data for the partial image, i.e., I((n+1)s) is used for the computation indicated at 580. That is, Img((n+1)s) is the cumulative result of the image conditioning at the previous time (n+1)s.

FIG. 7 shows the resultant timeline computations for an embodiment of the reverse inter-wavefield compression of the forward wavefield propagation path, with forward processing depicted in the timeline of FIG. 7A corresponding to the processing of FIG. 6A, and the backward processing depicted in the timeline of FIG. 7B corresponding to the processing of FIG. 6B.

Figure 8B:
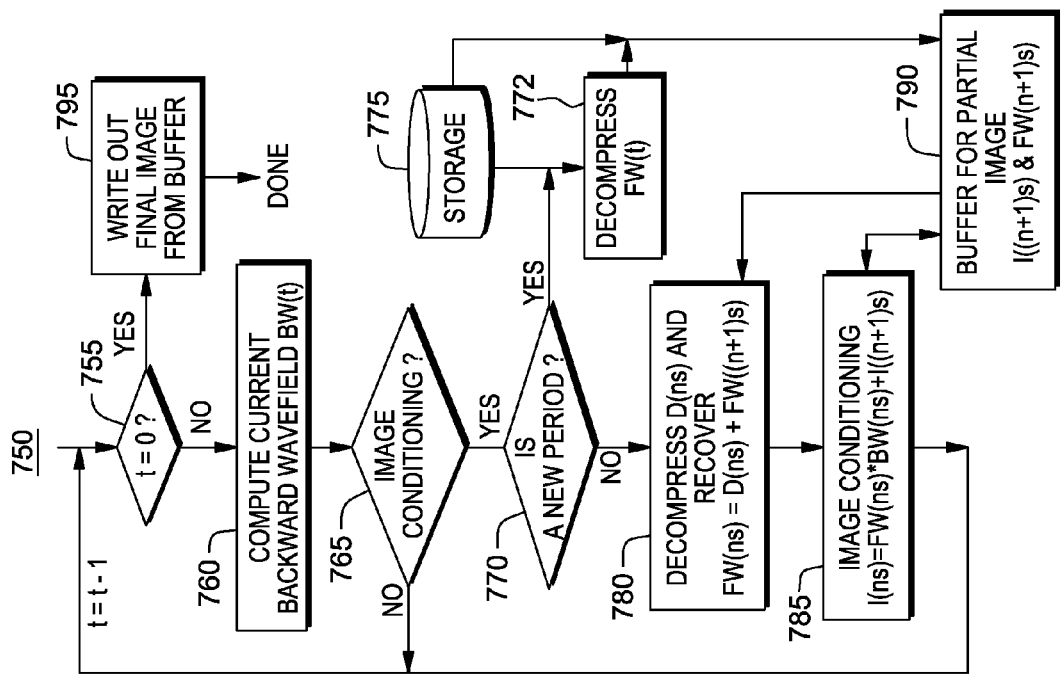
FIGS. 8A and 8B depict a further embodiment for periodic reverse inter-wavefield compression.
Figure 8A:
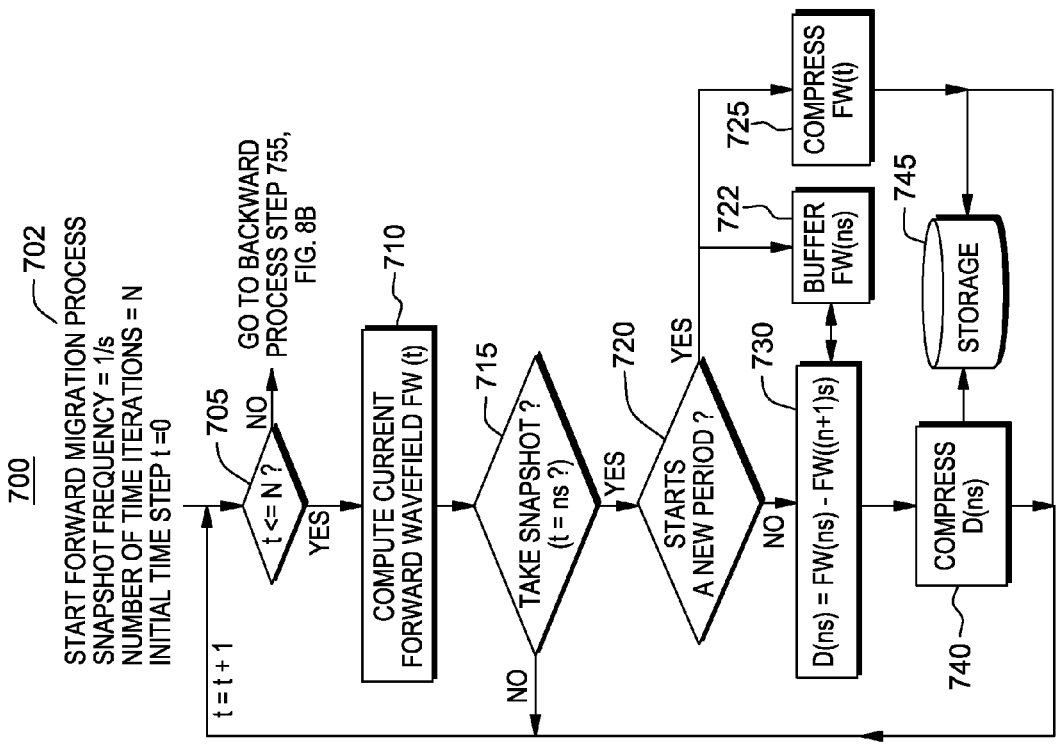

FIGS. 8A and 8B depict a further embodiment for periodic reverse inter-wavefield compression.

FIG. 8A shows, in one embodiment, Periodic Reverse Inter-Wavefield Compression processing method 500 for seismic imaging applications for lossy compression cases, and the treatment of stored compressed data used in the reverse time order computations. In this embodiment, prediction is in reverse, i.e., using the current waveform in the backward path, will not require the recovery of the whole dependency chain (prediction chain), only the last wavefield stored itself. The prediction chain is broken periodically to prevent predictive compression error to accumulate as now described with respect to FIG. 8A, 8B. That is, by taking the difference of wavefields in the reverse order, a reverse predictive encoding method is implemented such that, in the reverse propagation path, there is no need to recover and keep all previous snapshots before to recover a current snapshot due to the prediction dependent chain.

As shown in FIG. 8A at 702, the method first specifies in the forward migration process (a forward propagation path) a snapshot frequency=1/s; a number of time iterations=N; and an initial time step t=0, where "t" is an iteration time index; a period parameter=k; and, "n" is an index of the number of snapshots. It is understood that the data compression period k is programmable, i.e., the shorter the period "k" the less compression efficiency (as in each period, a wavefield is compressed, not the difference). Thus, the longer the period "k", the better compression efficiency achieved (and further, in accordance with the compression algorithm used to compression the data). As shown in the timeline of FIG. 8, the forward wavefield computing process obtains data $D_0$, $D_s$, $D_{2s}$, ..., $D_{(k-1)s}$, $FW_{(k)s}$, $D_{(k+1)s}$, $D_{(k+2)s}$ wherein, prior to k iterations, there is computed current forward wavefield FW(t). The method includes taking the difference of two wavefields at some time instant when a wavefield snapshot is needed; when a snapshot is needed, i.e., a wavefield difference calculation is performed to obtain $D_{ns}=FW_{ns}-FW_{(n+1)s}$. Then $D_{ns}$ is compressed and stored in memory or disk. Upon every $ks^{th}$ iteration in the forward path, a compression is taken of the current wavefield FW(t).

That is, as shown in FIG. 8A, in the forward wavefield propagation path: the computing system, at 705, performs determining whether the current time step "t" in the forward wavefield calculation path is at or prior to a time instant "N" when forward path iteration is completed, i.e., t<=N? If current time t is less than or equal to N, i.e., time t does not exceed N, then the process continues at 710 where the computing system performs computing the forward wavefield FW(t) at the current time step t. Otherwise, if it is determined at 705 that t>N, then the process proceeds to the backward wavefield propagation path step 755 of FIG. 8B.

Returning to 710, after computing the forward wavefield FW(t), a determination is then made at 715 whether a snapshot is to be taken. If a snapshot is to be taken, that is, at 715, if it is determined that t is a multiple of s, i.e., t=ns, then the process proceeds to 720 where a determination is made as to whether it is a start of a new wavefield compression period, i.e., when n=Mod(k), i.e., multiple of k. If, at 720, it is determined to start a new reverse waveform compression period, then the process proceeds to step 725 where the current computed forward wavefield FW(t) is compressed and temporarily stored in disk storage and proceed to the next time step. Further, at 720, if it is determined to start a new waveform compression period, the process additionally proceeds to step 722 where the current computed wavefield FW(ns) is to be held and (buffered or stored) temporarily in computing system memory, e.g., local system node memory. It is understood that the process will wait until the next time instant (n+1)s until the next wavefield snapshot data, FW(n+1)s, becomes available. If it is determined at step 720 not to start a new compression period, then the process proceeds to 730, FIG. 8A.

Otherwise, returning to 715, if it is determined that a current wavefield data is not to be stored, i.e., t≠ns, then the current wavefield is not stored, "t" is incremented by 1 (t=t+1), and the process returns to step 705.

At 730, FIG. 8A, when FW((n+1)s) becomes available at the next snapshot time instance, the inter-wavefield difference is computed according to:

$$D(ns)=FW(ns)-FW((n+1)s)$$

wherein compressed data D(ns) is reversely predictively encoded. Then D(ns) is compressed at 740 and stored in memory or sent out to disk at 745. The process returns to step 705, where the time step is incremented, i.e., t=t+1, and the process repeats for the further wavefield propagation.

Returning to 705, if it is determined that t>N, then the process proceeds to the backward wavefield propagation data calculations method 750 and particularly step 755 of FIG. 8B.

Continuing in backward propagation path step 755 of FIG. 8B, a determination is made as to whether t=0, i.e., the backwards propagation step has reached its final iteration in reverse time order. If it is determined that the current time t is equal to 0, this further indicates achieving the imaging condition and the "Final" computed image is written out from the memory storage buffer at 595 and the process terminates.

If, at 755, time t is not equal to zero, i.e., time t≠0, then the process continues at 760 where the backward wavefield propagation data BW(t) for that current time step "t" is computed.

The process proceeds to 765, where a determination is made as to whether it is time to perform image conditioning. If it is not time to perform image conditioning at 765, then time step "t" is decremented by 1 (t=t−1), and the process returns to step 755 for processing at the next (reverse time order) time instant. Otherwise, at 765, if it is determined that it is time to perform an image conditioning (i.e., t is a multiple of s), then the process proceeds to step 770 where a determination is made as to whether it is the start of a new wavefield decompression period, i.e., when Mod(n, k)=0, i.e., multiple of k. If, at 770, it is determined that a new reverse waveform decompression period has begun, then the process proceeds to step 772 where the stored current computed forward wavefield FW(ns) is retrieved from memory at 775 which may be the same memory storage device as data stored at 745 and at 772 the forward wavefield FW(ns) is decompressed, and the process proceeds to step 780.

At 780, FIG. 8B, the stored D(ns) is decompressed, and the inter-wavefield difference D(ns) is used to recover F(ns) according to:

$$FW(ns)=D(ns)+FW((n+1)s)$$

wherein decompressed data D(ns) was predictively encoded. Then D(ns) is decompressed at 780 and the previous recovered result FW((n+1)s) is buffered in local node memory storage at 790. The process then proceeds to step 785, where the image conditioning step is performed to compute:

$$Img(ns)=BW(ns)*FW(ns)+Img((n+1)s)$$

where the imaging conditioning result Img(ns) is temporarily stored as a partial image result at 790 and Img((n+1)s) is the previous image conditioning result stored at 790. From step 785, the process returns to step 755, where the time step is incremented, i.e., t=t+1, and the process repeats for the further backward wavefield propagation data computations and image generation.

Figure 9:
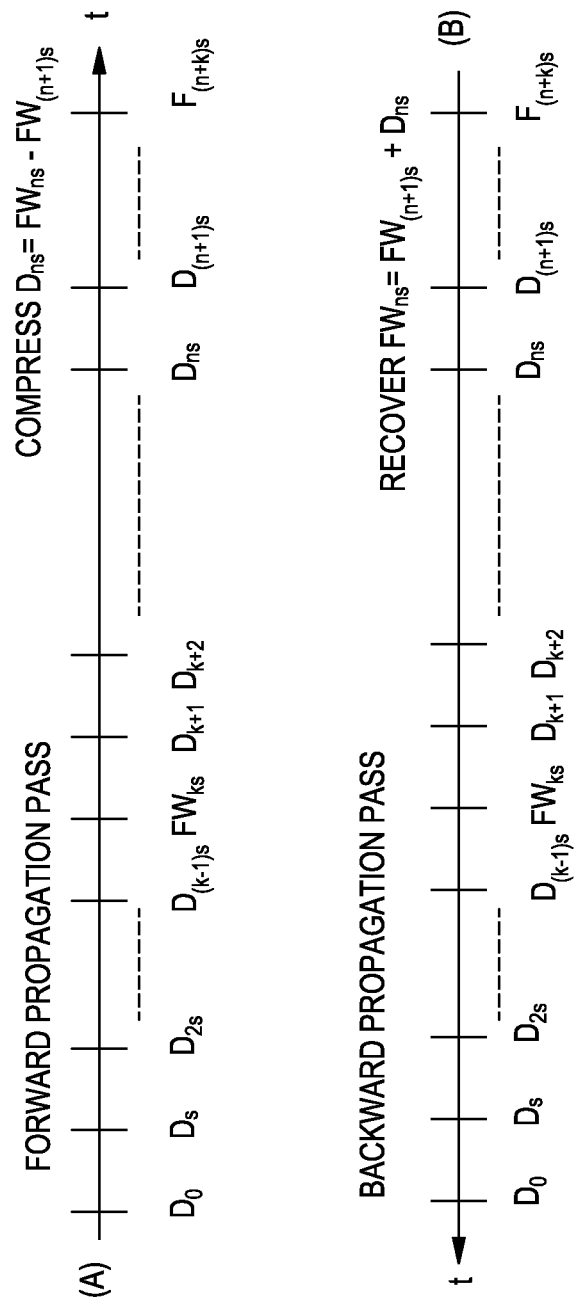
FIG. 9 conceptually depicts a timeline of the process of FIGS. 8A and 8B for obtaining wavefield difference data for periodic inter-wavefield compression at snapshot time steps.

FIG. 9 shows the resultant timeline computations for an embodiment of the periodic reverse inter-wavefield compression of the forward wavefield propagation path, with forward processing depicted in the timeline of FIG. 9A corresponding to the processing of FIG. 8A, and the backward processing depicted in the timeline of FIG. 9B corresponding to the processing of FIG. 8B.

The use of inter-wavefield compression can effectively achieve lossless compression and lossy compression ratio significantly higher than intra-wavefield compression, i.e., compression of wavefield self, while maintaining good image quality. The process reduces the amount of snapshot data to be stored and hence the amount of memory required or the amount of snapshot data to be written to and read from disk thus reduce the disk I/O latency and prevents disk I/O bottleneck and the process speed is increased. The storing of the intermediate data in memory enables faster computing.

As mentioned, in one example embodiment, the present system and method may operate in a massively parallel computing system such as the Blue Gene® (available from International Business Machines, Inc.) computing system.

The method implemented in the Blue Gene System® uses its aggregate memory as a high performance data fabric for handling intermediate data in Reverse Time Migration (RTM) seismic imaging process thereby alleviating the disk storage requirements in conventional RTM processing and thus reducing the total cost of the system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a circuit, module or system. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction. The containment (or storage) of the program may be non-transitory.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

Having thus described my invention, what I claim as new, and desire to secure by Letters Patent is:

1. A system for seismic imaging comprising:
a plurality of computing nodes of a computer system, each said computing node for computing data representing contributions of forward wavefield propagation data and reverse wavefield propagation in a RTM (reverse time migration) process in which a forward wavefields propagated by a shot is simulated in a forward propagation path at iterative time instants, and reverse wavefields propagated by said shot is simulated in a reverse propagation path at iterative time instants;
said computed forward wave propagation data and reverse wave propagation data contributions forming an imaging condition from which an image of sub-surface formations is created,
said system comprising, a processing device and a memory storage device associated with a computing node, said processing device configured to perform a method comprising:
during the simulation of said forward wavefields propagated in the forward wavefield propagation path, obtaining a difference of two forward wavefields computed at adjacent time instants;
compressing the difference and storing the compressed difference at a local memory storage device associated with a compute node;
during the simulation of said reverse wavefields propagated in the reverse propagation path, retrieving from the local memory storage device of the compressed difference of the forward wavefields at a time instant when image conditioning is needed;
decompressing the compressed difference,
recovering the forward wavefield from the compressed difference, and
generating a partial sub-surface image using the recovered forward wavefield from the compressed difference without recovery of a prediction dependency chain.

2. The system as claimed in claim 1, further comprising:
simulating a reverse wavefield prediction by implementing reverse predictive encoding in the reverse propagation path, wherein a need to recover and store all previous snapshots due to the prediction dependency chain is obviated.

3. The system as claimed in claim 2, wherein a current time instant is "t", and a parameter "s" represents a snapshot frequency 1/s, said obtaining a difference of two forward wavefields computed at adjacent time instants occurs at a multiple "n" of said snapshot frequency, s, where time step t=ns, where n is an integer.

4. The system as claimed in claim 3, wherein in the simulation of said forward wavefields propagated in the forward wavefield propagation path, said simulating said forward wavefield comprises:
determining whether a current time step "t" is at or prior to a final time instant "N" of forward path iterative time instants; and
if current time step t<=N, computing a forward wavefield propagation data at time said instant; otherwise, simulating a reverse wavefield in said reverse propagation path at said iterative time instances in reverse time order.

5. The system as claimed in claim 4 wherein for said current time step t≠ns, incrementing said time instant "t" and repeating a next time instant forward wavefield simulation.

6. The system as claimed in claim 3, further comprising:
determining whether a current time instant t=ns; and if said current time t=ns, computing a forward wavefield snapshot calculation, FW(t), and buffering said FW(ns) wavefield data in said local memory storage device, where t=ns.

7. The system as claimed in claim 6, wherein said obtaining the difference of two forward wavefields comprises, for said current time step t=ns:
waiting for a forward wavefield shot calculation at next adjacent time instant t=(n+1)s and computing wavefield data FW(n+1)s at said next time instant;
computing said compressed wavefield difference D(ns) according to D(ns)=FW(ns)−FW(n+1) s; and
storing D(ns) in said local memory storage device.

8. The system as claimed in claim 7, wherein said simulating said reverse wavefield in said reverse wavefield propagation path comprises:
determining whether a current time instant "t" corresponds to a time t=0 in reverse time order to achieve a final imaging condition and compute a final computed image; and,
if said current time instant t does not correspond to time for achieving a final imaging condition, computing a reverse wavefield propagation data value BW(t) for that current time step.

9. The system as claimed in claim 8, further comprising:
determining whether it is time to perform an image conditioning in said simulation of said reverse wavefields propagated in the reverse wavefield propagation path for use in computing said final image, and
if it is not time to perform image conditioning, decrementing said time instant "t" and repeating a next time instant reverse wavefield simulation in said reverse time order;
otherwise, if it is time to perform image conditioning, then computing an inter-wavefield difference value.

10. The system as claimed in claim 9, wherein to compute said inter-wavefield difference value, said method comprises:
obtaining a stored FW((n+1)s) value from said compute node local memory storage;
de-compressing said stored compressed D(ns) from said local memory storage device; and recovering said FW(ns) forward wavefield data value as
FW(ns)=D(ns)+FW((n+1)s) for use in computing an image conditioning value I(ns).

11. The system as claimed in claim 10, wherein said image conditioning value I(ns) is computed as:
I(ns)=FW(ns)*BW(ns)+I((n+1)s), where BW(ns) is a computed reverse wavefield propagation data value at time instant t=ns, and I((n+1)s) is a prior stored partial image from a prior image conditioning computation obtained from said local memory storage device image at a prior shot time instant t=(n+1)s in said reverse time order.

12. The system as claimed in claim 11, wherein a parameter 'k' represents a period parameter, said method further comprising:
determining whether a current time step t is a multiple of s such that t=ns, n is an integer;
further determining whether Mod(n,k)=0, such that n is a multiple of k; and,
at said current time step t=ns and Mod(n,k)=0, obtaining a compression of said current forward wavefield snapshot calculation FW(t), and storing said compressed forward waveform FW(t) in said local memory storage device at a compute node;

if t=ns but n is not a multiple of k, temporally keep FW(ns) in a buffer and proceed to propagate the forward wavefield FW( ) until to the next snapshot time (n+1)s when FW((n+1)s) is calculated, obtaining a difference D(ns) of the wavefields D(ns)=FW(ns)−FW((n+1)s) and compress and store the difference D(ns).

13. The system as claimed in claim 12, further comprising, during said simulation of said reverse wavefields propagated in the reverse propagation path:

determining whether a new period based on said multiple t=ns and Mod(n,k)=0 such that n is a multiple of k has begun; and if a new period based on said t=ns and Mod(n,k)=0 has begun, retrieving the stored compressed forward wavefield FW(t) from said local memory storage memory; and decompressing said forward wavefield FW(ks), wherein said de-compressing said stored compressed D(ns) from said local memory storage device uses said decompressed forward wavefield FW(ks).

14. A computer program product for inter-wavefield compression for seismic imaging, the computer program product comprising a non-transitory storage media readable by a processing circuit and storing instructions run by the processing circuit for performing a method, the method comprising:

computing data representing contributions of forward wavefield propagation data and reverse wavefield propagation in a RTM (reverse time migration) process in which a forward wavefields propagated by a shot is simulated in a forward propagation path at iterative time instants, and reverse wavefields propagated by said shot is simulated in a reverse propagation path at iterative time instants;

using said computed forward wave propagation data and reverse wave propagation data contributions to form an imaging condition from which an image of sub-surface formations is created, wherein, said method comprises:

during the simulation of said forward wavefields propogated in the forward wavefield propagation path, obtaining a difference of two forward wavefields computed at adjacent time instants; and compressing the difference and storing the compressed difference at a local memory storage device associated with a compute node; and during the simulation of said reverse wavefields propogated in the reverse propagation path, retrieving from the local memory storage device of the compressed difference of the forward wavefields at a time instant when image conditioning is needed;

decompressing the compressed difference, recovering the forward wavefield from the compressed difference, and generating a partial sub-surface image using the recovered forward wavefield from the compressed difference without recovery of a prediction dependency chain.

15. The computer program product as claimed in claim 14, further comprising:

simulating a reverse wavefield prediction by implementing reverse predictive encoding in the reverse propagation path, wherein a need to recover and store all previous snapshots due to the prediction dependency chain is obviated.

16. The computer program product as claimed in claim 15, wherein a current time instant is "t", and a parameter "s" represents a snapshot frequency 1/s, said obtaining a difference of two forward wavefields computed at adjacent time instants occurs at a multiple "n" of said snapshot frequency, s, where time step t=ns, where n is an integer.

17. The computer program product as claimed in claim 16, further comprising:

determining whether a current time instant t=ns; and if said current time t=ns, computing a forward wavefield snapshot calculation, FW(t), and buffering said FW(ns) wavefield data in said local memory storage device, where t=ns.

18. The computer program product as claimed in claim 17, wherein said obtaining the difference of two forward wavefields comprises, for said current time step t=ns:

waiting for a forward wavefield shot calculation at next adjacent time instant t=(n+1)s and computing wavefield data FW(n+1)s at said next time instant;

computing said compressed wavefield difference D(ns) according to D(ns)=FW(ns)−FW(n+1) s; and storing D(ns) in said local memory storage device.

19. The computer program product as claimed in claim 18, wherein said simulating said reverse wavefield in said reverse wavefield propagation path comprises:

determining whether a current time instant "t" corresponds to a time t=0 in reverse time order to achieve a final imaging condition and compute a final computed image; and, if said current time instant t does not correspond to time for achieving a final imaging condition, computing a reverse wavefield propagation data value BW(t) for that current time step.

20. The computer program product as claimed in claim 19, further comprising:

determining whether it is time to perform an image conditioning in said simulation of said reverse wavefields propagated in the reverse wavefield propagation path for use in computing said final image, and if it is not time to perform image conditioning, decrementing said time instant "t" and repeating a next time instant reverse wavefield simulation in said reverse time order;

otherwise, if it is time to perform image conditioning, then computing an inter-wavefield difference value.

21. The computer program product as claimed in claim 20, wherein to compute said inter-wavefield difference value, said method comprises:

obtaining a stored FW((n+1)s) value from said compute node local memory storage;

de-compressing said stored compressed D(ns) from said local memory storage device; and recovering said FW(ns) forward wavefield data value as FW(ns)=D(ns)+FW((n+1)s) for use in computing an image conditioning value I(ns).

* * * * *